United States Patent [19]
Farrell

[11] 3,744,337
[45] July 10, 1973

[54] TRANSMISSION CONTROL
[75] Inventor: Robert C. Farrell, Saginaw, Mich.
[73] Assignee: General Motors Corporation, Detroit, Mich.
[22] Filed: May 5, 1972
[21] Appl. No.: 250,731

[52] U.S. Cl.................................. 74/484, 74/485
[51] Int. Cl................................................ G05g 9/12
[58] Field of Search .................. 74/473 R, 473 SW, 74/484, 485, 486

[56] References Cited
UNITED STATES PATENTS
| | | | |
|---|---|---|---|
| 2,924,988 | 2/1960 | Primeau | 74/485 X |
| 3,025,714 | 3/1962 | Bliss | 74/486 X |
| 3,025,715 | 3/1962 | Grady | 74/485 X |
| 3,080,769 | 3/1963 | Wilson et al. | 74/484 X |
| 3,121,344 | 2/1964 | Fodrea | 74/486 X |

*Primary Examiner*—Allan D. Herrmann
*Attorney*—Warren E. Finken, John P. Moran et al.

[57] ABSTRACT

The drawings illustrate a spring-loaded ratchet-type arrangement for adjusting the lower steering column-mounted shift levers.

4 Claims, 3 Drawing Figures

Patented July 10, 1973  3,744,337

TRANSMISSION CONTROL

The invention relates generally to transmission control systems and, more particularly, to an adjustment means for lower steering column-mounted shift levers.

The conventional shift lever adjuster includes an axially movable spacer member mounted within the lower end of the shift tube adjacent the upper shift lever, and a plurality of bolts for securing the spacer member to the shift tube after axial adjustment thereof.

A general object of the present invention is to provide an improved shift lever adjustment means.

Another object of the invention is to provide an improved shift lever adjuster mechanism to replace the bolt-type arrangement.

A further object of the invention is to provide a shift lever adjustment means including a pair of adjacent cylindrical members each having a series of common arc-angle and arc-length toothed segments formed thereon and oppositely disposed for relative rotatable and axial movement of one member with respect to the other, thereby slidably adjusting the axial position of an adjacent shift lever for proper cooperation with the usual lower shift lever and the intermediate relay lever.

These and other objects and advantages of the invention will be apparent when reference is made to the following description and accompanying drawings, wherein.

Figure 1:
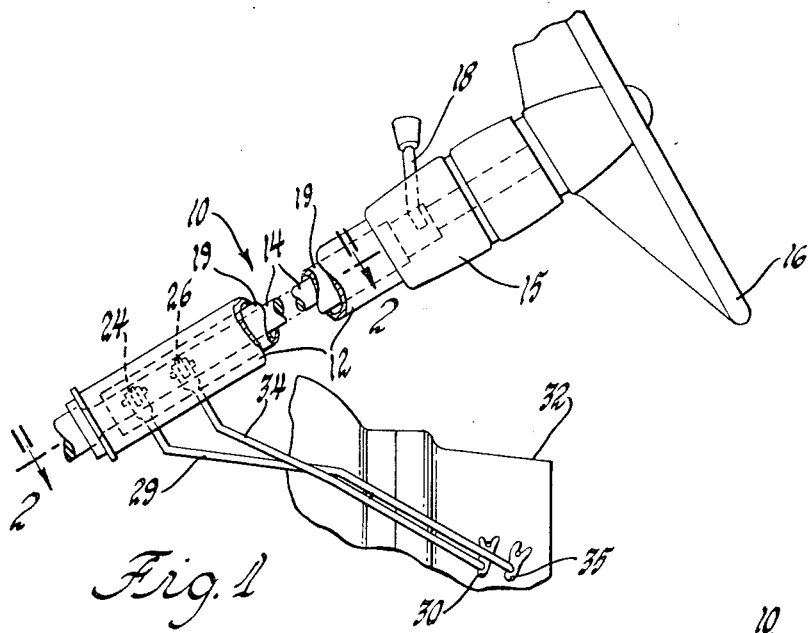
FIG. 1 is a fragmentary side view of a vehicular steering column embodying the invention.

Referring now to the drawings in greater detail, FIG. 1 illustrates a transmission control assembly 10 including a steering column jacket 12 which surrounds a steering shaft 14 and supports a shift bowl 15 and a steering wheel 16. A transmission shift selector lever 18 may be connected in any suitable manner, for example, as shown and described in U.S. Pat. No. 2,924,988 Primeau, for actuating a control tube 19 through rotary and reciprocating movement. The selector lever 18 is moved toward and away from the steering wheel 16 to reciprocate the control tube 19 for ratio selecting movement, and rotated about the axis of the steering column jacket 12 to rotate the control tube 19 for shifting movement.

A relay lever 20 (FIG. 2) having a slot or opening 21 formed in the radially outer end thereof is secured adjacent the lower end of the control tube 19. The relay lever 20 extends through a slot or opening 22 formed in a spacer 23 rotatably mounted around the control tube 19 intermediate respective lower and upper shift control levers 24 and 26 which are also rotatably mounted around the control tube 19. It may be noted that, upon axial movement of the relay lever 20 via the control tube 19 the relay lever 20 is selectively clutched to either the lower shift control lever 24 or to the upper shift control lever 26, the slot 21 meshing with one or the other of oppositely disposed projections 27 and 28 formed respectively on the lower and upper shift levers 24 and 26. The lower shift control lever 24 is connected by a rod 29 to a first-reverse or 1-R shift arm 30 extending from a transmission 32, while the upper shift control lever 26 is connected by a rod 34 to a second-third or 2-3 shift arm 35 extending from the transmission 32.

A suitable seal assembly 36 (FIG. 2) is mounted on the steering shaft 14 adjacent the lower ends of the jacket 12 and the control tube 19 and the outer face 37 of the lower shift control lever 24. The steering column jacket 12 is secured adjacent its lower end in a fixed abutment 38 located just above the upper shift control lever 26.

Figure 2:
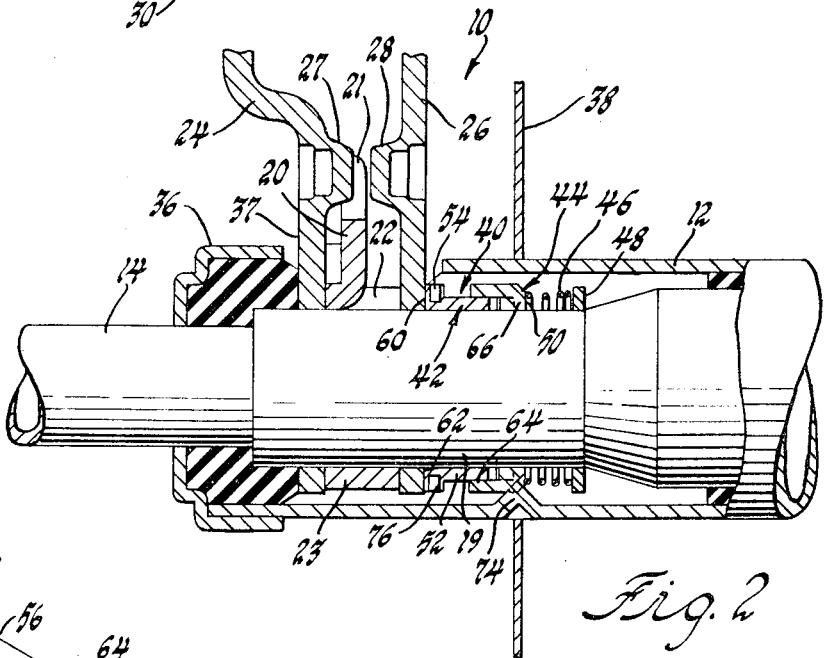
FIG. 2 is an enlarged cross-sectional view of the lower portion of a steering column embodying the invention.
Figure 3:
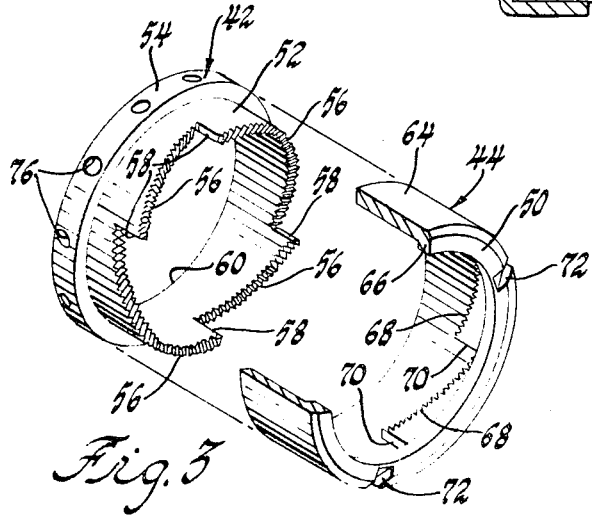
FIG. 3 is an enlarged perspective view of important elements of the invention.

An adjuster mechanism 40, for adjusting the upper or 2-3 shift control lever 26 relative to the lower or 1-R shift control lever 24, is illustrated in place on the control tube 19 in FIG. 2 and in more detail in FIG. 3. The adjuster mechanism 40 includes an inner adjuster member 42 and an outer adjuster member 44, adjustably interconnected in a manner to be described.

A spring 46 (FIG. 2) is mounted around the control tube 19 between a fixed retainer 48 and an end face 50 of the outer adjuster member 44, serving to urge the retainer 48 and, hence, the control tube 19 and the relay lever 20 upwardly (to the right in FIG. 2) any time the selector lever 18 is left in Neutral, to engage the 2-3 shift lever 26.

As may be more clearly noted in FIG. 3, the inner adjuster member 42 includes a cylindrical portion 52 having an outwardly extending flange or collar 54 formed on one end thereof. A first plurality of knurled or toothed arcuate segments or inclines 56 are formed on the other end thereof, there being a transverse or axially extending wall segment 58 formed to join the higher and lower ends of the adjacent arcuate segments 56. The outer face 60 (FIG. 2) of the flange 54 end abuts against the adjacent face 62 of the 2-3 shift control lever 26.

The outer adjuster member 44 includes a cylindrical portion 64 which slidably fits over the cylindrical portion 52 of the inner adjuster member 42. An inwardly extending flange or collar 66 is formed adjacent the end face 50 of the outer adjuster member 44, the flange 66 being freely mounted around the control tube 19. A second plurality of knurled or toothed arcuate segments or inclines 68 are formed on the flange 66, extending a predetermined distance within the cylindrical portion 64. A transverse or axially extending wall segment 70 joins the higher and lower ends of respective adjacent arcuate segments 68. All of the toothed segments 56 and 68 are the same arcuate length and angle, with the sets of segments 56 and 68 facing one another, such that the respective oppositely disposed individual segments 56 and 68 intermesh.

A plurality of spaced tapered slots 72 are formed on the end face 50 of the outer adjuster member 44 for interlocking contact with respective indentations 74 formed on the steering column jacket 12. Thus the adjuster member 44 is prevented from rotating but may move slightly axially while retaining the indentations 74 in the slots 72.

It is at assembly, once all the components have been mounted on the control tube 19 that some adjustment of the 2-3 upper shift lever 26 relative to the lower 1-R shift lever 24 is normally required. Such adjustment of the upper shift lever 26, if required, is generally in the direction toward the lower shift lever 24 to take up the slack between the lower lever 24 and the spacer 23 and between the spacer 23 and the upper lever 26. In order to accomplish the adjustment process, it is merely necessary to insert a suitable tool (not shown) into any one of a plurality of indentations or openings 76 formed around the outer periphery of the collar 54 of the inner adjuster member 42, and rotate the latter as required to axially move the upper shift lever 26 along the control tube 19 toward the lower lever 24, confining the spacer 23 therebetween, to thereby provide the proper adjustment of the upper shift control lever 26 with respect to the lower shift control lever 24. It is preferred that the width of each tooth 56 and 68 be approximately 0.005 inch, the maximum adjustment generally required being approximately 0.010 inch.

Specifically, as the inner adjuster member 42 is rotated in a counterclockwise direction, as viewed from the left end in FIG. 3, for example, the toothed segments 56 will rotate along the toothed segments 68 in a "ratcheting" manner, moving the higher end of each segment 56 away from the lower end of each respective segment 68 and toward the higher end thereof, thus lenthening the overall length of the adjuster mechanism 40. Counterclockwise movement of the inner adjuster member 42, of course, moves each wall segment 58 of the member 42 away from each respective adjacent wall segment 70 of the member 44. In turn, as the arcuate segments 56 move circumferentially along the arcuate segments 68, the member 42 moves axially away from the member 44, thereby moving the adjacent shaft lever 26 axially toward the shift lever 24 until the desired adjustment is made against the end of the spacer 23 for proper relative rotation of the shift control levers 24 and 26, regardless of which lever 24 or 26 the relay lever 20 is engaged with at any time during the shift change cycle.

It should be apparent that the invention provides an improved, readily accessible and easily actuable adjustment arrangement for axially adjusting one lower steering column-mounted shift lever with respect to the other shift lever.

While but one embodiment of the invention has been shown and described, other modifications thereof are possible.

I claim:

1. For use with a pair of shift levers mounted on the lower end of a control tube of a vehicular steering column, a shift lever adjustment arrangement comprising first and second cylindrical adjustment members rotatably and slidably connected to said control tube and to each other adjacent the upper of said pair of shift levers, a fixed abutment formed on said control tube, resilient means mounted on said control tube intermediate said fixed abutment and one of said first and second adjustment members urging said member into contact with the other of said first and second adjustment members, first and second pluralities of arcuate segments formed on said respective first and second adjustment members, each of said first and second pluralities of arcuate segments having a common arc, a transverse segment connecting respective lower and higher ends of circumferentially adjacent arcuate segments, and a plurality of teeth formed on each of said arcuate segments such that rotation of said first adjustment member relative to said second adjustment member causes said teeth of said first member to move along said teeth of said second member to thereby move said first member axially with respect to said second member and simultaneously axially adjust said upper shift lever with respect to the lower of said pair of shift levers.

2. For use with a pair of shift levers mounted on the lower end of a control tube of a vehicular steering column, a shift lever adjustment arrangement comprising a first member rotatably and slidably mounted around said control tube adjacent the upper of said pair of shift levers, a second member rotatably and slidably mounted around said first member, a fixed abutment formed on said control tube, resilient means mounted on said control tube intermediate said fixed abutment and said second member urging said second member into contact with said first member, a first plurality of stepped arcuate segments formed on said first member, a second plurality of stepped arcuate segments formed on said second member, each of said first and second pluralities of stepped arcuate segments having a common arc, a vertical wall segment connecting respective lower and higher ends of circumferentially adjacent stepped arcuate segments, and a plurality of teeth formed on each of said arcuate segments, said teeth of said first member being movable along said teeth of said second member upon rotation of said first member relative to said second member to thereby move said first member axially with respect to said second member effecting the axial adjustment of said upper shift lever with respect to the lower of said pair of shift levers.

3. For use with a pair of shift levers mounted on the lower end of a control tube of a vehicular steering column, a shift lever adjustment arrangement comprising a first adjustment member rotatably and slidably mounted around said control tube adjacent the upper of said pair of shift levers, a second adjustment member rotatably and slidably mounted around said first adjustment member, a fixed abutment formed on said control tube, resilient means mounted on said control tube intermediate said fixed abutment and said second adjustment member urging said second adjustment member into contact with said first adjustment member, a first plurality of arcuate segments formed on an end face of said first adjustment member, a second plurality of arcuate segments formed on an inner surface of said second adjustment member, each of said first and second pluralities of arcuate segments having a common arc angle and length, an axially extending wall segment connecting respective lower and higher ends of circumferentially adjacent arcuate segments, a plurality of teeth formed on each of said arcuate segments, and means formed on said first adjustment member for rotating said first adjustment member relative to said second adjustment member to thereby cause said teeth of said first adjustment member to move along said teeth of said second adjustment member in a ratcheting manner to move said first adjustment member axially with respect to said second adjustment member and thereby slidably adjust said upper shift lever axially with respect to the lower of said pair of shift levers.

4. For use with a pair of shift levers mounted on the lower end of a control tube of a vehicular steering column, a shift lever adjustment arrangement comprising a first cylindrical member rotatably and slidably mounted around said control tube adjacent the upper of said pair of shift levers, a second cylindrical member slidably mounted around said first member, an external flange formed adjacent an end face of said first cylindrical member, said externally flanged end abutting against said upper of said pair of shift levers, an internal flange formed adjacent an end face of said second cylindrical member, a fixed abutment formed on said control tube, a spring mounted around said control tube intermediate said fixed abutment and said internally flanged end of said second cylindrical member urging said second cylindrical member into contact with said first cylindrical member, a first plurality of equal-length and equal-angle arcuate segments formed on the end face of said first cylindrical member opposite said externally flanged end, a second plurality of equal-length and equal-angle arcuate segments formed on the inner face of said internal flange of said second cylindrical member, a plurality of axially extending wall segments connecting respective lower and higher ends of adjacent arcuate segments on each of said first and second cylindrical members, a plurality of teeth formed on each of said arcuate segments, and a plurality of indentations formed on said external flange for rotating said first cylindrical member relative to said second cylindrical member, causing said teeth of said first cylindrical member to slide over the adjacent teeth of said second cylindrical member, thereby moving said first cylindrical member axially with respect to said second cylindrical member and thus slidably adjusting said upper shift lever axially with respect to the lower of said pair of shift levers.

* * * * *